United States Patent

Juday et al.

[11] Patent Number: 5,538,110
[45] Date of Patent: Jul. 23, 1996

[54] VALVING FOR VANE DAMPER

[75] Inventors: Ben S. Juday, Plainwell; Kent M. Curtis, Battle Creek, both of Mich.

[73] Assignee: Eaton Corporation, Cleveland, Ohio

[21] Appl. No.: 872,860

[22] Filed: Apr. 23, 1992

[51] Int. Cl.$^6$ .................................................. F16D 3/80
[52] U.S. Cl. .......................................... 188/296; 464/27
[58] Field of Search ........................ 188/296, 294, 188/292, 293, 291, 307, 308, 73.2, 72.5, 71.6, 71.5; 267/272, 275; 464/27, 58; 192/106.2, 3.28, 3.21, 3.29, 12 BA, 12 A, 106.1, 3.33, 3.38

[56] References Cited

U.S. PATENT DOCUMENTS

| 187,424 | 2/1877 | Slicer | 185/45 |
|---|---|---|---|
| 2,114,247 | 4/1938 | Davis | 192/68 |
| 3,091,447 | 5/1963 | Donkin | 267/1 |
| 3,208,303 | 9/1965 | Durouchoux | 74/572 |
| 3,246,485 | 4/1966 | Chapman | 64/27 |
| 4,181,208 | 1/1980 | Davis | 192/106.1 |
| 4,653,755 | 1/1987 | Arechaga | 257/272 |
| 4,768,637 | 9/1988 | Bopp et al. | 192/106.1 |
| 4,782,936 | 11/1988 | Bopp | 192/106.2 |
| 4,864,872 | 9/1989 | Stahl | 188/246 |
| 5,078,648 | 1/1992 | Stretch | 464/27 |
| 5,078,649 | 1/1992 | Leichliter et al. | 464/27 |

FOREIGN PATENT DOCUMENTS 2611013  2/1987  France .

Primary Examiner—Matthew C. Graham
Attorney, Agent, or Firm—Paul S. Rulon; L. J. Kasper

[57] ABSTRACT

A torsion isolator assembly (30) for reducing driveline torsionals includes a vane damper (36) including improved valving (40d, 40e) for increasing the damping factor of the damper, improved spiral springs (32,34 or 80,82) for reducing spring stress primarily due to centrifugal forces, and cam surfaces (44d,44c) for further reducing spring stress due to centrifugal forces.

7 Claims, 4 Drawing Sheets

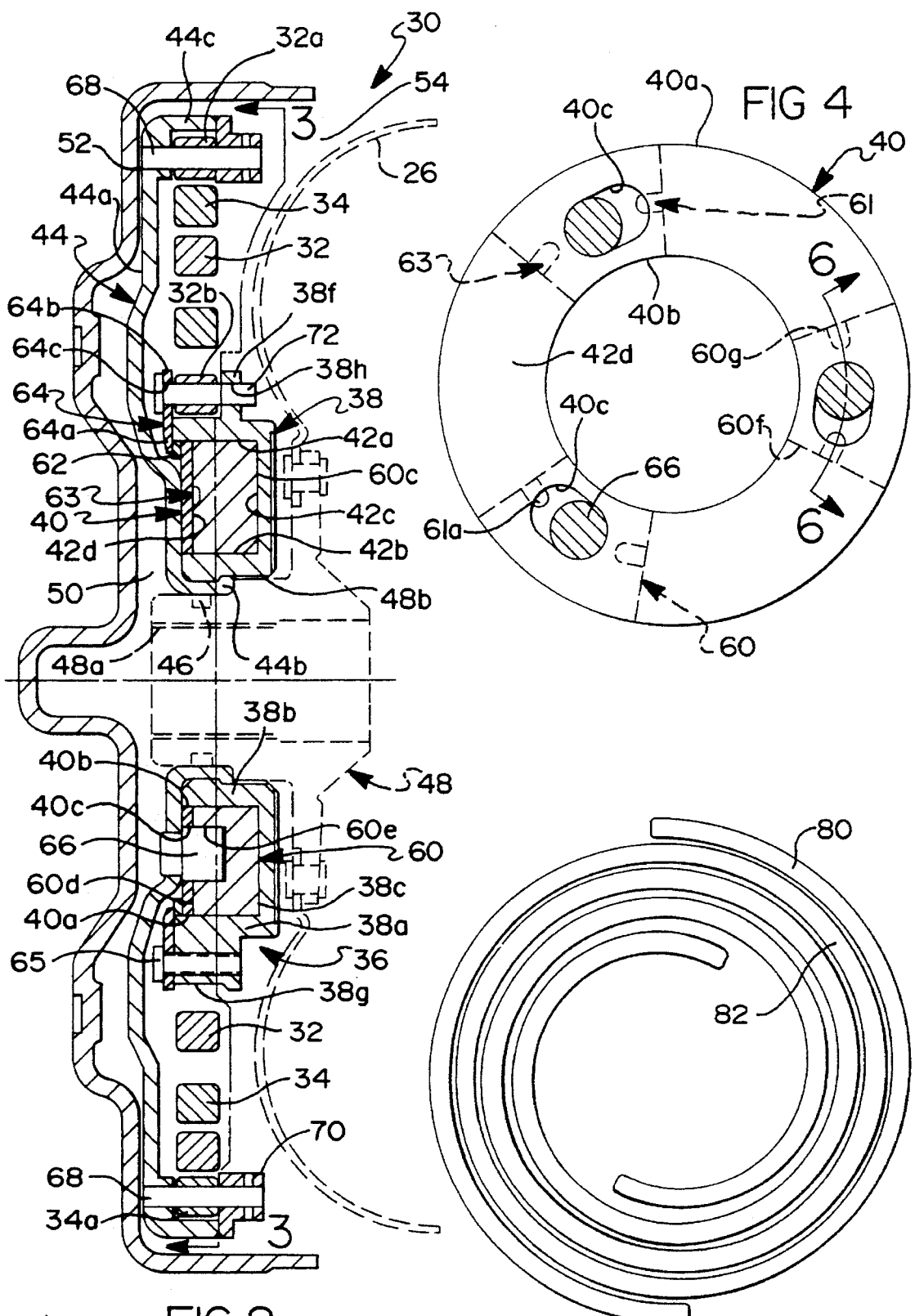

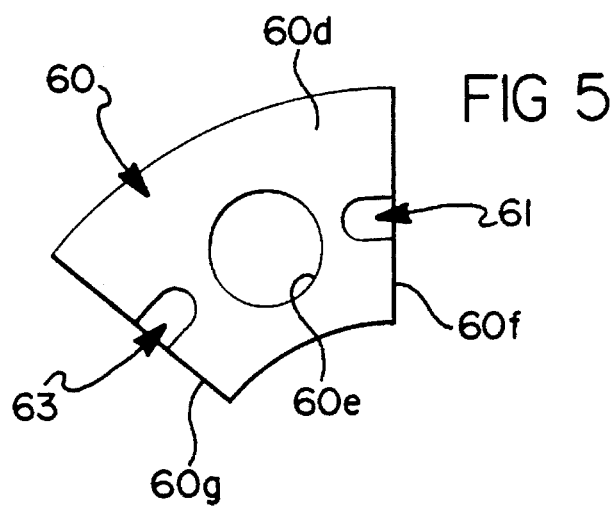
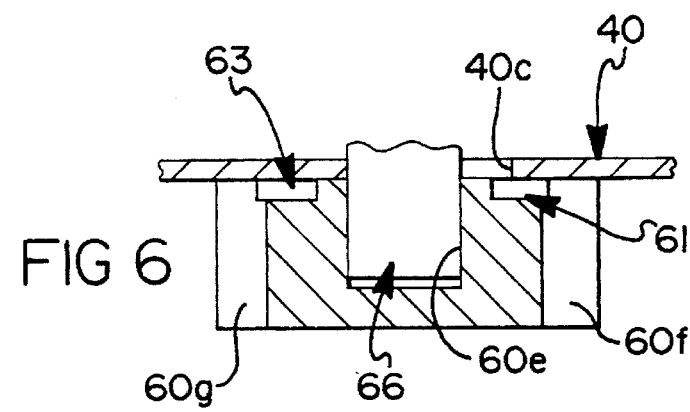
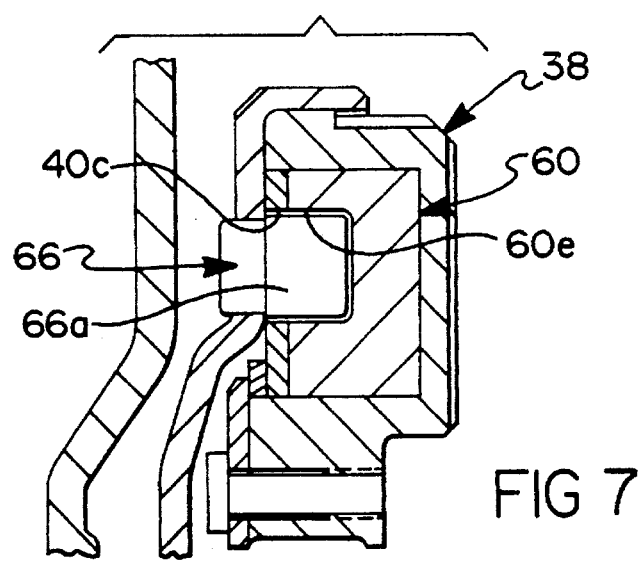

னற5,538,110

VALVING FOR VANE DAMPER

CROSS REFERENCE

This application is related to U.S. application Ser. Nos. 07/873,434 having Attorney Docket No. 90-rMAR-278, 07/872,876 having Attorney Docket No. 91-rMAR-511 and 07/872,853 having Attorney Docket No. 92-rMAR-067. All of these applications are filed on the same day, all are assigned to the assignee of this application and all are incorporated herein by reference.

FIELD OF THE INVENTION

This invention relates to a valving arrangement for a hydraulic vane damper. More specifically, this invention relates to such a damper disposed in parallel with torsion isolator springs for use in a vehicle driveline.

BACKGROUND OF THE INVENTION

It is well-known that the speed of an Otto or Diesel cycle engine output or crankshaft varies even during so-called steady-state operation of the engine, i.e., the shaft continuously accelerates and decelerates about the average speed of the shaft. The accelerations and decelerations are, of course for the most part, a result of power pulses from the engine cylinders. The pulses may be of uniform frequency and amplitude when cylinder charge density, air/fuel ratio, and ignition are uniform. However, such uniformity does not always occur, thereby producing pulses which vary substantially in frequency and amplitude. Whether uniform or not, the pulses, which are herein referred to as torsionals, are transmitted through vehicle drivelines and to passengers in vehicles. The torsionals, which manifest themselves as vibrations, are detrimental to drivelines and derogate passenger-ride quality. Further, when an engine is abruptly accelerated and/or decelerated by accelerator pedal movement or other factors, torque pulses ring through the driveline and also derogate ride quality, such pulses are herein also referred to as torsionals.

Since the inception of automobiles, many torsional isolator mechanisms have been proposed and used to isolate and dampen driveline torsionals. The isolator mechanism proposed in U.S. Pat. No. 5,078,649 includes, as does the isolator mechanism herein, flat, long travel spiral springs connected in parallel with a vane damper device. Both mechanisms are disposed in a torque converter housing and immersed in the pressurized torque converter oil therein. U.S. Pat. No. 5,078,649 is incorporated herein by reference. The amount of damping (i.e., damping factor) provided by the vane damper device in this patent has been considered marginal in some applications due to cost and reliability of a valving arrangement therein, and the spiral springs therein have also been considered of marginal life expectancy due to high stresses in some applications during certain operating conditions. The springs disclosed herein may be employed with other than vane damper devices and the vane damper device herein may be employed with other than spiral springs.

The isolator mechanism disclosed herein includes features for overcoming the above mentioned disadvantages.

SUMMARY OF THE INVENTION

An object of this invention is to provide a torsion damper device having an improved damping factor.

According to a feature of this invention, a torsion assembly is adapted to be disposed for rotation about an axis in a driveline torque converter housing filled with an incompressible torque converter fluid. The assembly is immersed in the fluid and is drivingly connected between first and second rotatably mounted drives. The assembly comprises resilient means for transmitting driveline torque between the drives and a hydraulic coupling for damping torque fluctuations in response to flexing of the resilient means. The coupling includes first and second relatively rotatable housing means defining an annular chamber having radially spaced apart cylindrical surfaces and first and second axially spaced apart end surfaces. The cylindrical surfaces and the first end surfaces are defined by the first housing means. Circumferentially spaced apart walls are sealing fixed to the first housing means and extend radially and axially across the annular chamber for dividing the annular chamber into at least two independent arcuate chambers. A piston is disposed in each arcuate chamber for driving each arcuate chamber into pairs of first and second volumes which vary inversely in volume in response to movement of the pistons relative to the first housing means. Each piston has radially oppositely facing surfaces in sliding sealing relation with the chamber cylindrical surfaces, first and second axially oppositely facing end surfaces in sliding sealing relation respectively with the first and second end surfaces of chamber, and first and second circumferentially spaced apart and oppositely facing surfaces intersecting the first and second end surfaces. The second housing means includes an annular radially extending housing member having an axially facing surface defining the second end surface of the annular chamber. The housing member second end surface is in sliding sealing relation with each piston second end surface. The housing member is in sliding sealing relation with portions of the first housing means, is retained against axial movement in a direction away from the first surface of the annular chamber by means affixed to the first housing means, and includes a set of circumferentially spaced and axially extending through openings. Piston drive means connect the pistons to the first drive via a path independent of the resilient means. The piston drive means extend through the housing member openings with circumferential free play therebetween for allowing limited to-and-fro circumferential movement of the pistons relative to the housing member, and the piston drive means are connected to each piston at a position intermediate the first and second circumferentially facing surfaces thereof. Housing drive means connect the first housing means to the second drive independent of the resilient means. Passage means effect fluid communication of the pairs of volumes with the fluid in the torque converter housing.

The invention is characterized by the passage means including first and second recesses in each piston second end surface and respectively extending circumferentially in opposite directions from an inlet thereof spaced from the drive means by a portion of the piston second end surface and to positions respectively communicating with the first and second volumes. Each first recess inlet is sealingly covered by the housing member second end surface and each second recess inlet opens into the associated housing member opening in response to movement of the pistons in a direction tending to decrease the first volumes, thereby respectively sealing the first volumes from communication with fluid in the torque converter housing via the first recesses and communicating the second volumes with fluid in the torque converter housing via the second recesses. Each second recess inlet is sealingly covered by the housing member second end surface and each first recess inlet opens into the associated housing member opening in response to movement of the pistons in a direction tending to decrease the second volumes, thereby respectively sealing the second volumes from communication with fluid in the torque converter housing via the second recesses and communicating the first volumes with fluid in the torque converter housing via the first recesses.

BRIEF DESCRIPTION OF THE DRAWINGS

The torsion isolator assembly of the present invention is shown in the accompanying drawings in which:

FIG. 2 is a detailed sectional view of the isolator assembly looking along staggered section line 2—2 of FIG. 3;

FIG. 4 is a sectioned view of a portion of the isolator mechanism looking leftward in FIG. 2;

FIG. 5 is a relief view of a piston in the isolator assembly;

FIG. 6 is a sectional view of a portion of the isolator assembly looking along line 6—6 of FIG. 4;

FIG. 7 is a sectional view of a modified portion of the isolator mechanism;

FIG. 8 is an alternative embodiment in reduced size of spiral springs shown in FIGS. 2 and 3.

DETAILED DESCRIPTION OF THE DRAWINGS

Figure 1:
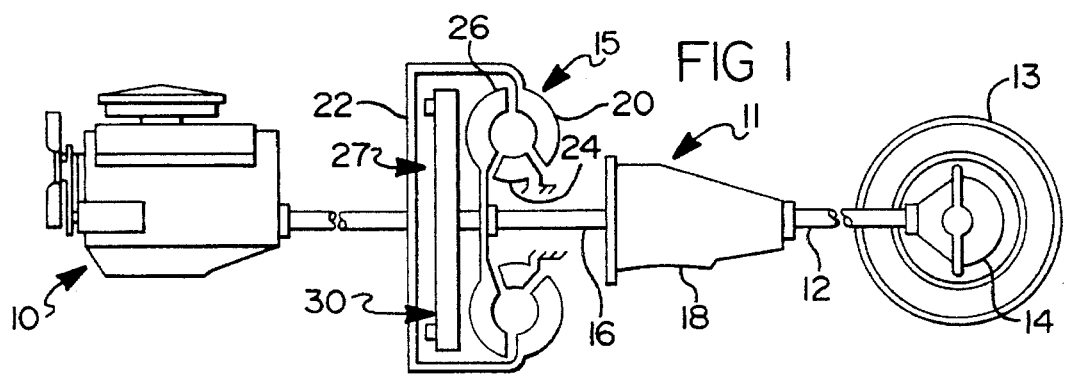
FIG. 1 schematically illustrates a motor vehicle driveline including a torque converter type transmission employing a torque converter bypass drive embodying the torsion isolator assembly.

The motor vehicle driveline seen schematically in FIG. 1 includes an internal combustion engine 10, an automatic transmission 11 and a drive shaft 12 driving a load such as rear or front wheels 13 of a vehicle through a differential 14.

The transmission includes a torque converter assembly 15 having an output shaft 16 and a gear ratio box 18 driven by the torque converter output shaft 16. Torque converter assembly 15 is filled with automatic transmission fluid and includes, in known manner, an impeller 20 driven from engine 10 through a torque converter housing 22, a stator 24, and a turbine 26 driven hydrokinetically by the impeller. A fluid coupling may be employed in lieu of a torque converter.

Torque converter assembly 15 further includes a bypass driveline seen generally at 27 in FIG. 1. Bypass driveline 27 is operative when selectively actuated to provide a bypass drive between torque converter housing 22 and torque converter output shaft 16 through a torsion damping isolator assembly 30 thereby bypassing the high slippage drive path through the torque converter.

Referring now to FIGS. 2–6, isolator assembly 30 includes a pair of nested, flat, spiral wound springs 32,34 disposed normal to the axis of the assembly, and a vane type damper mechanism 36 including housing members 36,40 defining an annular chamber 42, and a clutch or piston plate 44. Plate 44 includes a radially extending portion 44a having an axially extending hub portion 44b at its center and an axially extending flange portion 44c at its radially outer edge. An outer cylindrical surface of hub portion 44b has an inner cylindrical surface of housing member 38 journaled therein to maintain concentricity between the plate and housing. An inner cylindrical surface of hub portion 44b cooperates with an o-ring seal 46 carried in an annular recess in an outer surface of an adapter 48. The adapter is affixed to torque converter turbine 26 and includes internal splines 48a for mating with splines on shaft 16 and external splines 48b for slidably mating with splines on housing member 38.

During non-bypass operation of the torque converter, pressurized transmission oil is admitted to the torque converter via a chamber 50 receiving the oil through passages in shaft 16 in known manner. The oil in chamber 50 prevents frictional engagement of plate 44 with a friction lining 52 affixed to the shown portion of torque converter housing 22. The oil thus flows radially outward in chamber 50 past lining 52 and into the torque converter via a main torque converter chamber 54 separated from chamber 50 by plate 44. When it is desired to engage the isolator assembly, as for example, when the vehicle is operating in a higher gear ratio and above a predetermined vehicle speed, the direction of flow of the pressurized oil is reversed by actuation of a suitable valve, not shown. Specifically, the pressurized oil is now admitted first to chamber 54 where it acts against the radially extending portion 44a of plate 44 and slides the entire isolator assembly to the left to frictionally engage lining 52. Driveline torque now bypasses the torque converter and is transmitted to shaft 16 by spiral springs 32,34 which flex to attenuate torsionals in the torque. Damper assembly controls the rate of flexing of the springs.

Annular chamber 42 includes radially spaced apart cylindrical surfaces 42a, 42b defined by axially extending annular wall portions 38a, 38b of housing member 38, and axially spaced apart end surfaces 42c, 42d respectively defined by a radially extending portion 38c of housing member 38 and housing member 40. Annular chamber 42 is divided into three arcuate chambers 56 sealed from each other by fixed vanes or walls 58. The walls are press fit into grooves in wall portions 38a, 38b, 38c and extend radially and axially across the annular chamber. The radially outer extent of axially extending wall 38a includes a radially outwardly extending flange 38f and a pair of scroll or spiral shaped pad portions 38g to reduce bending stress concentration in the inner convolutions of the springs when they decrease in overall diameter due to transmission of torque in the positive direction of arrow A.

Each arcuate chamber 56 is divided into pairs of variable volume chambers 56a, 56b by moveable vanes or pistons 60. Pistons 60 are each separate members but may be affixed together in a manner similar to that in U.S. Pat. No. 4,768,637, which patent is incorporated herein by reference. Each piston 60 includes radially outer and inner surfaces 60a, 60b in sliding sealing relation with housing member cylindrical surfaces 42a, 42b, an axially facing end surface 60c in sliding sealing relation with housing end surface 42c, and an axially facing end surface 60d in sliding sealing relation with end surface 42d of housing member 40. Axial spacing of piston end surfaces 60c, 60d between end surfaces 42c, 42d of the chamber and between surface 42d and the adjacent ends of walls 38a, 38b is controlled and maintained by an annular shim 62 sandwiched between housing member 40 and a radially inner portion 64a of an annular flange 64. Flange 64 abuts the free axial end of housing wall 38a and is affixed to housing member 38 by appropriate fasteners, such as by two sets of three fasteners 65 which extend through openings in flange 64, openings in pad portion 38g, and opening in flange portion 38f. A radially outer portion 64b of flange 64 includes through openings 64c spaced one hundred-eighty degrees apart and in axial alignment with openings 38h in flange portions 38f.

Housing member 40 includes outer and inner circumferential surfaces 40a, 40b in sliding sealing relation with cylindrical wall surfaces 42a, 42b, and three circumferentially spaced apart elongated through openings 40c which loosely receive round pin lugs 66 fixed at one end to clutch plate 44 and at the other end are slidably received in recesses 60e in the pistons. Since pistons 60 are separate members, lugs 66 position and fix the circumferential spacing of the pistons relative to each other. The view of housing member 40 in FIG. 4 is looking rightward with pin lugs 66 in section and pistons 60 shown in phantom lines behind member 40.

Figure 3:
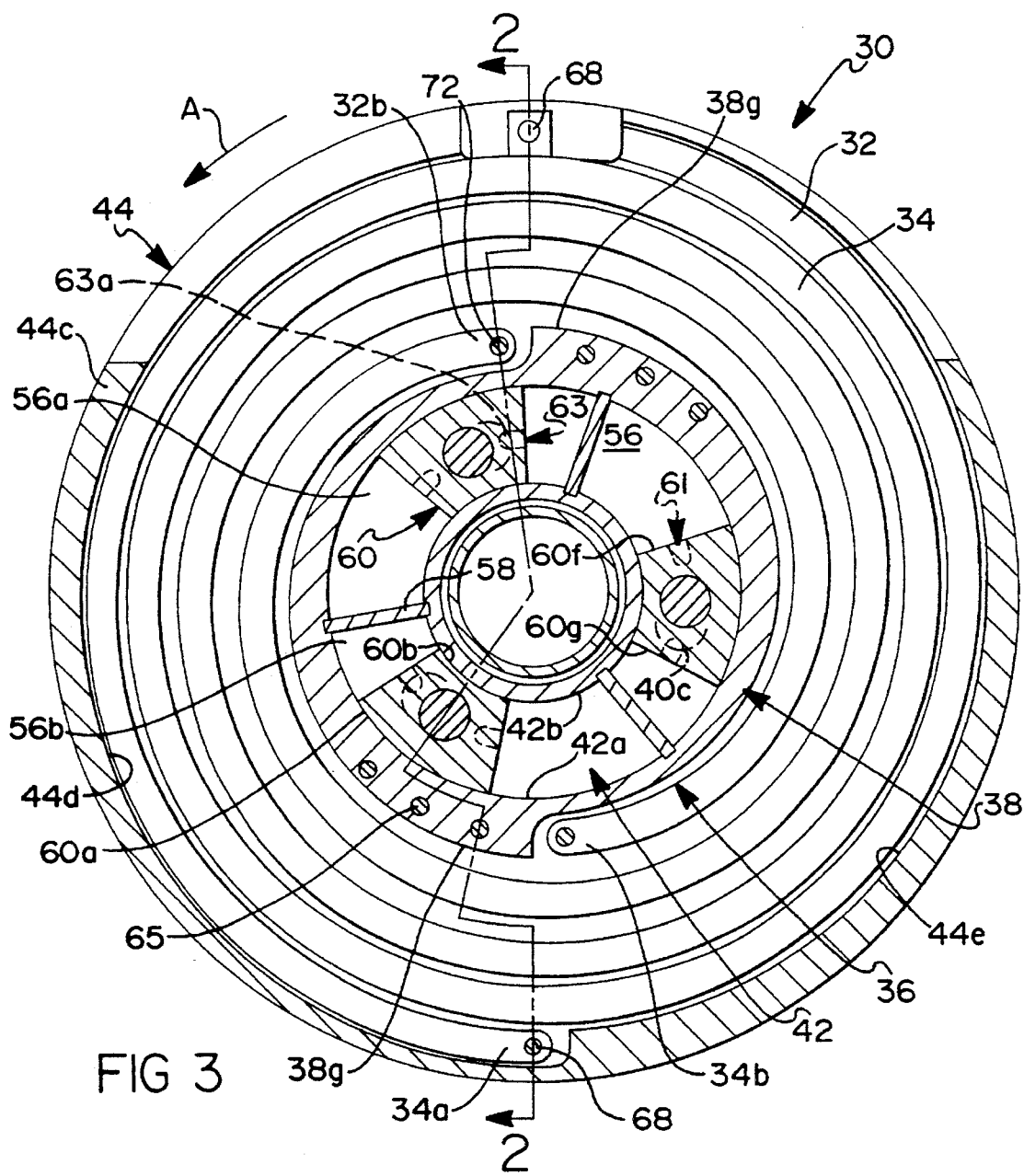
FIG. 3 is a reduced size detailed sectional view of the isolator assembly looking along staggered section line 3—3 of FIG. 2.

Pistons 60 each include circumferentially oppositely facing surfaces 60f, 60g and porting recesses 61,63 for directing pressurized make-up oil from the torque converter chamber 54 into variable volume chambers 56a, 56b. The porting recesses extend circumferentially in opposite directions from an inlet end 61a, 63a thereof to an outlet end thereof in direct communication with chambers 56a, 56b. The circumferential free play between pin lugs 66 and through openings 40c allows suffice limited circumferential movement of the pistons relative housing member 40 for surface 46d to sealingly cover one set of the porting recess and uncover the inlet ends of the other set in response to torque in either direction. Each inlet 61a, 63a is spaced from the pin lugs 66 or piston pin lug recesses 60e by portions of piston surface 60d which cooperate with housing member surface 40d to seal the inlets from communication with make-up oil via the openings 40c. As seen by use of phantom lines in FIG. 3, porting recess inlets 61a are sealing covered by housing member surface 40d, and porting recess inlets 63a are uncovered and open into housing member openings 40c when torque transmission is in a direction tending to decrease volumes 56a and increase volumes 56b, thereby sealing volumes 56a from communication with the pressurized oil in torque converter chamber 54 via porting recesses 61 and communicating the pressurized make-up oil to volumes 56b via recesses 63a. FIG. 4, which is viewed in a direction opposite the direction of FIG. 3, illustrates the position of the pistons and housing member 40 when torque transmission is in a direction tending to decrease volumes 56b and increase volumes 56a. Pistons 60 are preferably formed in known manner of compacted powered metal with piston pin recesses 60e and porting recesses 61,62 being formed during the compacting process.

In vane damper 36, as thus far described, pin lugs 66 are received in piston recesses 60e with little or no clearance therebetween. Alternatively, pin lugs 66 and piston recesses 60e may have additional clearance or free play therebetween so as to provide a lost motion between piston plate 44 and pins 66 for providing a non-hydraulic damping zone of 1 or 2 or more rotational degrees. Herein, as shown in FIG. 7, the clearance is provided by reducing the diameter of a portion 66a of the pin lugs received in piston recesses 60e.

Spring convolutions 32,34 respectively include radially outer ends 32a, 34a and radially inner ends 32b, 34b. The ends may be attached in any of several known ways, e.g., such as disclosed in previously mentioned U.S. Pat. No. 5,078,649. Herein it should suffice to say that outer ends 32a, 34a are pivotally secured to the radially outer extent of clutch plate 44 by pins 68 and brackets 70, and with the pins locked in place by unshown split pins in known manner. The inner ends 32b, 34b of the springs are secured to housing member 38 by pins 72 extending through axially aligned openings 64c, 38h and are locked in place in the same manner as pins 68. When the springs are transmitting positive torque and tending to wind up, pivotal movement of the spring ends 32b, 34b is limited by scroll pads 38g. When the springs are transmitting negative torque or being acted on by centrifugal forces and therefore tending to unwind or expand radially outward, pins 72 allow free pivotal movement of spring inner ends 32b, 34b. Herein, maximum wind-up or unwinding of the spiral spring convolutions is limited by engagement of piston surfaces 60f, 60g with walls 58. By way of example, wind-up is limited to +52 degrees and unwinding is limited to −25 degrees. The springs are shown in the relaxed state in FIG. 3.

The spiral spring convolutions disclosed in previously mentioned U.S. Pat. No. 5,078,649 have a shape commonly referred to as a spiral of Archimedes wherein each convolution curve is generated by a point moving away from or toward a fixed point at a constant rate while the radius vector from the fixed point rotates at a constant rate and that has the equation $\rho = a\theta$ in polar coordinates. The convolutions formed according to this equation increase in radius at a constant rate and have all radially adjacent surfaces radially spaced the same distance apart.

The flex range of such spiral springs readily allow substantial relative rotation between the shafts they interconnect and, therefore, are considered well suited for torsion isolator mechanisms since they allow a damping device connected in parallel therewith to have a long travel for more smoothly damping torsionals. However, high stresses acting at several locations along the length of the convolutions has limited use of such springs in torsion isolator mechanisms in applications subjecting the springs to relatively high spin speeds and torque loads encountered in automotive vehicles.

The spiral spring convolutions 32,34, which have substantially the same circumferential length (≈720 degrees) and cross-sectional dimensions as the springs in the above mentioned patent, are modified to reduce stress thereon due to torque transmission and due to centrifugal forces acting thereon. Also, flange 44c of plate 44 is provided with cam surfaces 44d, 44e circumferentially extending between the outer ends of the convolutions to further reduce stress on the convolutions due primarily to centrifugal forces encountered during relatively high spin speeds while transmitting little or no torque to a load.

The spring modification consists of forming the convolution such that radially adjacent surfaces of radially outer portions of the nested convolutions have a lesser radial spacing therebetween than do radially inner portions of the convolutions. This is accomplished, using the spiral of Archimedes equation, by forming the first half or three hundred-sixty degrees of the convolutions from inner ends 32b, 34b with a greater rise rate than the remainder or outer lengths of the convolutions. Alternatively, the spiral of Archimedes equation may be modified to provide convolutions which uniformly decrease in rise rate to provide closer spacing of the outer convolutions. One example of such an equation is given by $\rho = a(\theta)\theta$ wherein the coefficient "a" is now a function of $\theta$ rather than a constant. Springs 80, 82 in FIG. 8 are an example of springs formed according to this governing equation.

Stresses due primarily to high spin speeds are reduced by radially inwardly facing cam surfaces 44d, 44e having spiral profiles extending substantially the full circumferential distance between outer ends 32a, 34a or attachment pins 68. When two nested springs are used, the circumferential distance is approximately one hundred and eighty degrees. The cam surfaces are positioned to be engaged by the adjacent radially outwardly facing surface of the associated convolutions in response to centrifugal forces acting on the springs. The cam surfaces limit radial outward movement of the convolutions due to the centrifugal forces and provide smooth reaction surfaces substantially conforming to the spiral shapes of the convolutions extending between the outer ends of the convolutions.

Figure 9:
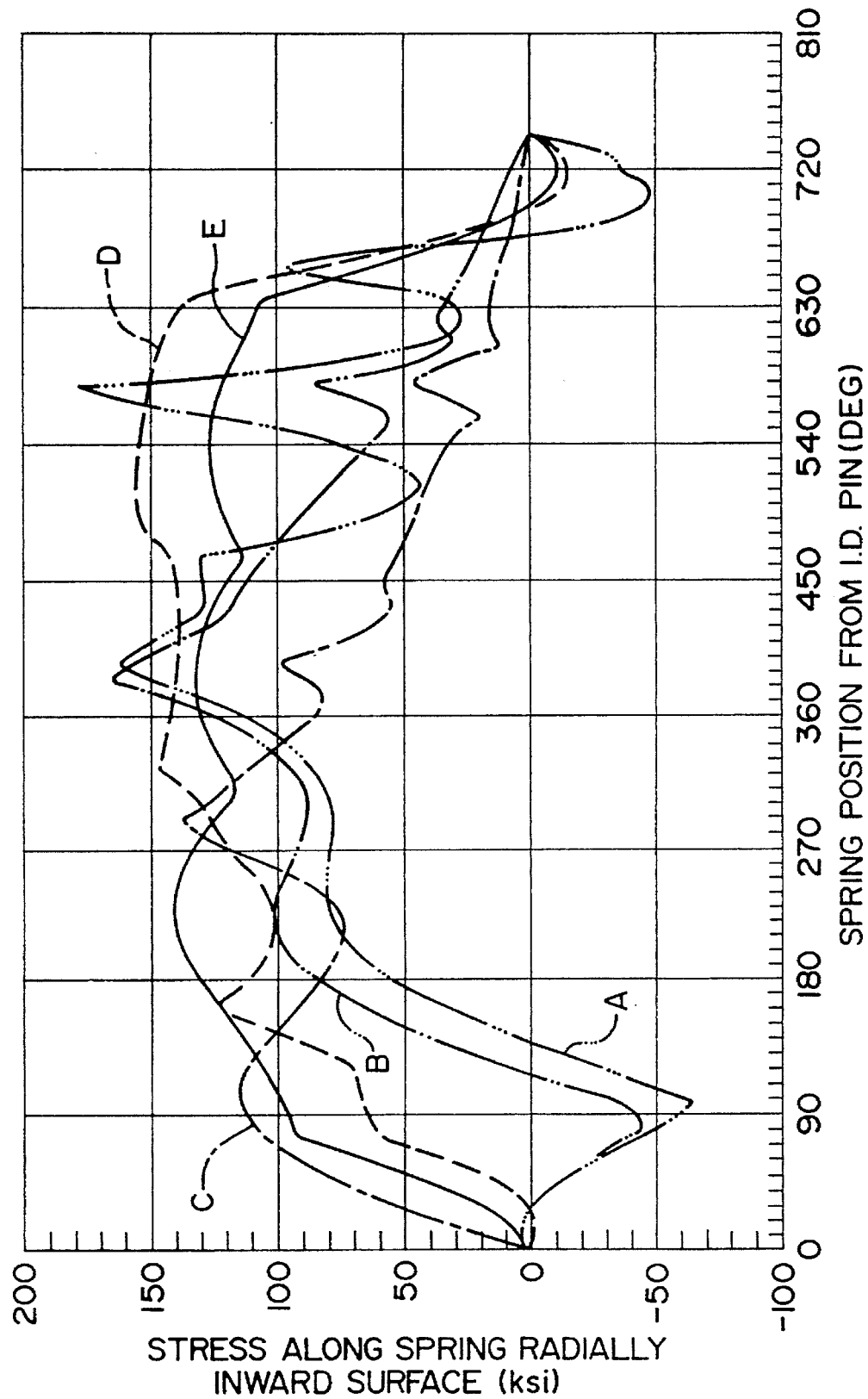
FIG. 9 is a graph illustrating stress on the spiral springs.

The graph of FIG. 9 illustrates stress along the length of the spiral convolutions by a curve A for a baseline spring having the same radial spacing between the nested convolutions and having cam surfaces extending about half the distance between the outer ends of the convolutions, by a curve B for the baseline springs with full cam surfaces 44d, 44e according to FIG. 3, and by a curve C for the modified spring of FIG. 6 with the full cam surfaces. Stress curves A,B and C represent stress at the indicated positions along the length of the convolutions with the isolator mechanism not connected to a load and operating at 7000 rpm with the springs flexed to the −25 degrees position, such condition being considered a worse case condition for stress due to centrifugal forces.

The graph of FIG. 9 also illustrates stress along the length of the spiral convolutions by a curve D for the baseline springs at zero rpm and flexed to the +52 degree position, and by curve E for the modified springs of FIG. 5 at zero rpm and flexed to the +52 degree position.

While the embodiments of the present invention have been illustrated and described in detail, it will be apparent that various changes and modifications may be made in the disclosed embodiments without departing from the scope or spirit of the invention. The appended claims are intended to cover these and other modifications believed to be within the spirit of the invention.

What is claimed is:

1. A torsion isolator assembly adapted to be disposed for rotation about an axis in a driveline torque converter housing filled with an incompressible torque converter fluid, the assembly immersed in the fluid and drivingly connected between first and second rotatably mounted drives; the assembly comprising resilient means for transmitting driveline torque between the drives and a hydraulic coupling for damping torque fluctuations in response to flexing of the resilient means; the coupling including first and second relatively rotatable housing means defining an annular chamber having radially spaced apart cylindrical surfaces and first and second axially spaced apart end surfaces, the cylindrical surfaces and the first end surface defined by the first housing means, and circumferentially spaced apart walls sealingly fixed to the first housing means and extending radially and axially across the annular chamber for dividing the annular chamber into at least two independent arcuate chambers; a piston disposed in each arcuate chamber for dividing each arcuate chamber into pairs of first and second volumes which vary inversely in volume in response to movement of the pistons relative to the first housing means, each piston having radially oppositely facing surfaces in sliding sealing relation with the chamber cylindrical surfaces and having first and second axially oppositely facing end surfaces in sliding sealing relation respectively with the first and second end surfaces of the chamber, and having first and second circumferentially spaced apart and oppositely facing surfaces intersecting the first and second end surfaces; the second housing means including an annular radially extending housing member having an axially facing surface defining the second end surface of the annular chamber, the second end surface being in sliding sealing relation with each piston second end surface, the housing member being in sliding sealing relation with portions of the first housing means and retained against axial movement in a direction away from the first end surface of the annular chamber by means affixed to the first housing means, and the housing member having a set of circumferentially spaced and axially extending through openings; piston drive means for connecting the pistons to the first drive via a path independent of the resilient means, the piston drive means extending through the housing member openings with circumferential free play therebetween for allowing limited to-and-fro circumferential movement of the pistons relative to the housing member, and the piston drive means connected to each piston at a position intermediate the first and second circumferentially facing surfaces thereof; housing drive means for connecting the first housing means to the second drive independent of the resilient means; and passage means for effecting fluid communication of the pairs of volumes with the fluid in the torque converter housing; characterized by:

the passage means including first and second recesses in each piston second end surface and respectively extending circumferentially in opposite directions from an inlet thereof spaced from the drive means by a portion of the piston second end surface and to positions respectively communicating with the first and second volumes, each first recess inlet sealingly covered by the housing member second end surface and each second recess inlet opening into the associated housing member opening in response to movement of the pistons in a direction tending to decrease the first volumes, thereby respectively sealing the first volumes from communication with fluid in the torque converter housing via the first recesses and communicating the second volumes with fluid in the torque converter housing via the second recesses, and each second recess inlet sealingly covered by the housing member second end surface and each first recess inlet opening into the associated housing member opening in response to movement of the pistons in a direction tending to decrease the second volumes, thereby respectively sealing the second volumes from communication with fluid in the torque converter housing via the second recesses and communicating the first volumes with fluid in the torque converter housing via the first recesses.

2. The torsion isolator assembly of claim 1, wherein:

the resilient means comprises at least two flat spiral wound springs having nested spiral convolutions, each convolution including a radially outer end secured to the piston drive means and a radially inner end secured to the first housing means.

3. The torsion isolator assembly of claim 2, wherein:

the piston drive means includes an annular radially extending clutch plate disposed for frictional engagement with the torque converter housing, the plate having a radially outer portion for attachment of the convolution outer ends thereto at circumferentially spaced distances apart and a radially inner portion having drive lugs extending through the housing member openings and drivingly connecting the plate to each piston.

4. The torsion isolator assembly of claim 3, wherein:

the clutch plate radially outer portion includes radially inwardly facing cam surface means of spiral profile extending substantially the full circumferentially spaced distance between the convolution outer ends, each cam surface means positioned to be engaged by a radially outward facing surface of an associated spiral convolution portion in response to centrifugal forces acting on the springs, the cam surface means for limiting radially outward movement of the convolutions due to the centrifugal forces and for providing smooth reaction surfaces substantially conforming to the spiral shapes of the convolution portions extending between the outer ends of the convolutions.

5. The torsion isolator assembly of claim 1, wherein:

the piston drive means include means connecting the pistons to the first drive with substantially no rotational free play therebetween.

6. The torsion isolator assembly of claim 1, wherein:

the piston drive means includes means connecting the pistons to the first drive with at least one rotational degree of free play therebetween.

7. The torsion isolator assembly of claim 1, wherein:

the pistons are formed of compacted powered metal and the porting recesses are formed in the second end surfaces of the pistons while initially forming the pistons.

* * * * *